United States Patent
Chen

(10) Patent No.: US 9,312,691 B2
(45) Date of Patent: Apr. 12, 2016

(54) ESD PROTECTION CIRCUIT AND ESD PROTECTION METHOD THEREOF

(71) Applicant: Silicon Motion, Inc., Jhubei, Hsinchu County (TW)

(72) Inventor: Te-Wei Chen, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 160 days.

(21) Appl. No.: 14/317,166

(22) Filed: Jun. 27, 2014

(65) Prior Publication Data
US 2015/0098159 A1    Apr. 9, 2015

(30) Foreign Application Priority Data
Oct. 4, 2013    (TW) .............................. 102135959 A

(51) Int. Cl.
*H02H 9/04*    (2006.01)
(52) U.S. Cl.
CPC ...................................... *H02H 9/046* (2013.01)
(58) Field of Classification Search
CPC ................................ H02H 9/04; H02H 9/046
USPC ........................................................... 361/56
See application file for complete search history.

(56) References Cited

U.S. PATENT DOCUMENTS

| | | | |
|---|---|---|---|
| 5,767,733 A * | 6/1998 | Grugett | H03K 17/063 327/436 |
| 7,221,551 B2 | 5/2007 | Chen | |
| 7,495,873 B2 * | 2/2009 | Bhattacharya | H01L 27/0266 361/56 |
| 2004/0084730 A1 | 5/2004 | Morishita | |
| 2006/0044714 A1 | 3/2006 | Chen | |
| 2009/0273867 A1 * | 11/2009 | Whitfield | H01L 27/0248 361/56 |
| 2011/0019317 A1 | 1/2011 | Vinson | |
| 2012/0081821 A1 | 4/2012 | Li | |
| 2012/0286327 A1 | 11/2012 | Coyne | |

FOREIGN PATENT DOCUMENTS

TW    201216445    4/2012

OTHER PUBLICATIONS

English language machine translation of TW 201216445 (published Apr. 16, 2012).

* cited by examiner

*Primary Examiner* — Thienvu Tran
*Assistant Examiner* — Kevin J Comber
(74) *Attorney, Agent, or Firm* — McClure, Qualey & Rodack, LLP

(57) ABSTRACT

The present invention provides an ESD protection circuit including a discharge transistor, a first switch, a second switch, a third switch and a fourth switch. The discharge transistor forms a discharge path between a first voltage terminal and a second voltage terminal. The first switch selectively provides voltage at the first voltage terminal to a control terminal of the discharge transistor. The second switch selectively provides voltage at the second voltage terminal to the control terminal of the discharge transistor. The third switch selectively provides voltage at the first voltage terminal to a substrate of the discharge transistor. The fourth switch selectively provides voltage at second voltage terminal to the substrate of the discharge transistor.

26 Claims, 10 Drawing Sheets

US 9,312,691 B2

ESD PROTECTION CIRCUIT AND ESD PROTECTION METHOD THEREOF

CROSS REFERENCE TO RELATED APPLICATIONS

This application claims priority of Taiwan Patent Application No. 102135959, filed on Oct. 4, 2013, the entirety of which is incorporated by reference herein.

BACKGROUND OF THE INVENTION

1. Field of the Invention

The present invention is related to an ESD protection circuit and an ESD protection method; and in particular to an ESD protection circuit and an ESD protection method using a plurality switch for switching discharge path.

2. Description of the Related Art

Static electricity discharge has always been a major problem for circuit designers. Various environmental factors can cause electrostatic voltage buildup; buildup can reach thousands, or even tens of thousands of volts. During electrostatic discharge, the high temperatures caused by high transient currents are able to melt away circuits and other elements causing the destruction of the whole system.

Basic Integrated Circuits (ICs) all have ESD protection circuits connected to their pins, the external pins on ICs are usually used to provide power, send signals and provide grounding. Basic ESD protection circuits have 2 modes; one is normal use and the other is electrostatic protection. During normal use mode an ESD protection circuit closes the flow of electricity throughout the circuit itself. For the ICs it is as if the ESD protection circuit was not present. During electrostatic protection mode, the ESD protection circuit provides protection to the IC, quickly transferring static electricity to the power source pins or grounding mechanism, protecting the circuits and elements from any harm.

BRIEF SUMMARY OF THE INVENTION

A detailed description is given in the following embodiments with reference to the accompanying drawings.

The present invention discloses an ESD protection circuit including a first voltage terminal, a second voltage terminal, a discharge transistor, a first switch, a second switch, a third switch and a fourth switch. The discharge transistor has a first terminal coupled to the first voltage terminal, a second terminal coupled to the second voltage terminal, a control terminal coupled to a first node, and a substrate coupled to a second node, wherein the discharge transistor forms a discharge path between the first voltage terminal and the second voltage terminal. The first switch is coupled between the first voltage terminal and the first node, arranged to selectively provide voltage at the first voltage terminal to the control terminal of the discharge transistor. The second switch is coupled between the first node and the second voltage terminal, arranged to selectively provide voltage at the second voltage terminal to the control terminal of the discharge transistor. The third switch is coupled between the first voltage terminal and the second node, arranged to selectively provide voltage at the first voltage terminal to the substrate of the discharge transistor. The fourth switch is coupled between the second node and the second voltage terminal, arranged to selectively provide voltage at second voltage terminal to the substrate of the discharge transistor.

The present invention further discloses an ESD protection method applied to an ESD protection circuit, wherein the ESD protection circuit comprises a discharge transistor, a first switch, a second switch, a third switch and a fourth switch. The ESD protection method includes: selectively providing voltage at a first voltage terminal or a second voltage terminal to a control terminal of the discharge transistor by the first switch or the second switch according to the voltage at the first voltage terminal and the second voltage terminal to turn on the discharge transistor; selectively providing the voltage at the first voltage terminal or the second voltage terminal to a substrate of the discharge transistor by the third switch or the fourth switch according to the voltage of the first voltage terminal or the second voltage terminal to turn on the discharge transistor; and discharging the current of the first voltage terminal to the second voltage terminal by the discharge transistor, or discharging the current of the second voltage terminal to the first voltage terminal by the discharge transistor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
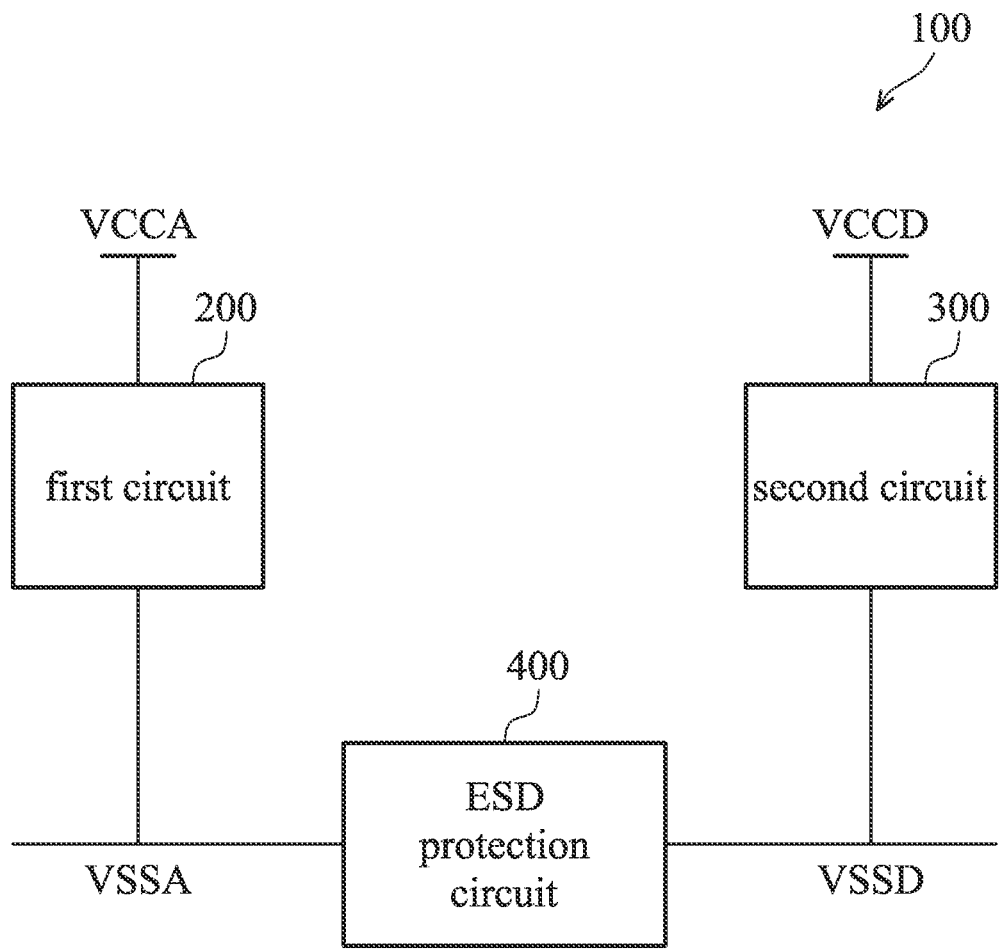
FIG. 1 is a schematic diagram illustrating an embodiment of an electronic system of the present invention.

FIG. 1 is a schematic diagram illustrating an embodiment of an electronic system of the present invention. The electronic system 100 includes a first voltage terminal VSSA, a second voltage terminal VSSD, a third voltage terminal VCCA, a fourth voltage terminal VCCD, a first circuit 200, a second circuit 300 and an ESD protection circuit 400. The first circuit 200 is coupled between the first voltage terminal VSSA and the third voltage terminal VCCA. The second circuit 300 is coupled between the second voltage terminal VSSD and the fourth voltage terminal VCCD. For example, the first voltage terminal VSSA and the second voltage terminal VSSD are coupled to the ground, and the third voltage terminal VCCA and the fourth voltage terminal VCCD are coupled to the same voltage source or respectively coupled to two different voltage sources. The ESD protection circuit 400 is arranged to be coupled between the first voltage terminal VSSA and the second voltage terminal VSSD. When the voltage at the first voltage terminal VSSA is greater than the voltage at the second voltage terminal VSSD by a predetermined value, the ESD protection circuit 400 is arranged to discharge the current of the first voltage terminal VSSA to the second voltage terminal VSSD. When the voltage at the second voltage terminal VSSD is greater than the voltage at the first voltage terminal VSSA by a predetermined value, the ESD protection circuit 400 is arranged to discharge the current of the second voltage terminal VSSD to the first voltage terminal VSSA. It should be noted that, in one embodiment, the first circuit 200 and the second circuit 300 are arranged in two the different circuits having different power domains on a chip, respectively.

Figure 2:
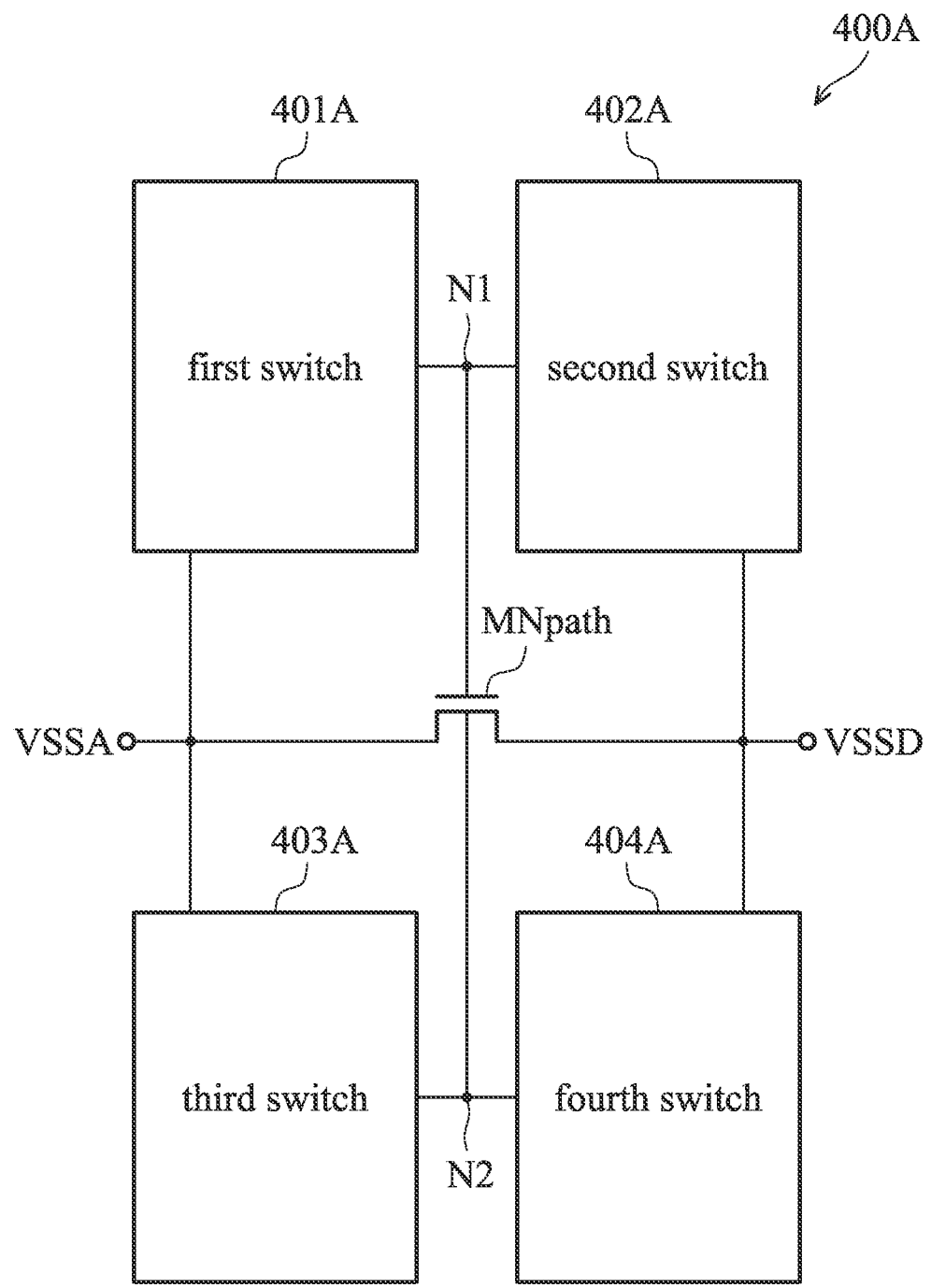
FIG. 2 is a schematic diagram illustrating an embodiment of an ESD protection circuit of the electronic system shown in FIG. 1 of the present invention.

FIG. 2 is a schematic diagram illustrating an embodiment of an ESD protection circuit of the electronic system shown in FIG. 1 of the present invention. The ESD protection circuit 400A includes a first voltage terminal VSSA, a second voltage terminal VSSD, a discharge transistor MNpath, a first switch 401A, a second switch 402A, a third switch 403A and a fourth switch 404A. The discharge transistor MNpath has a first terminal coupled to the first voltage terminal VSSA, a second terminal coupled to the second voltage terminal VSSD, a control terminal coupled to a first node N1 and a substrate coupled to the second node N2, wherein the discharge transistor MNpath forms a discharge path between the first voltage terminal VSSA and the second voltage terminal VSSD. It should be noted that, in this embodiment, the discharge transistor MNpath is a N-type field effect transistor. The first switch 401A is coupled between the first voltage terminal VSSA and the first node N1, and arranged to provide the voltage at the first voltage terminal VSSA to the control terminal of the discharge transistor MNpath. The second switch 402A is coupled between the first node N1 and the second voltage terminal VSSD, and arranged to provide the voltage at the second voltage terminal VSSD to the control terminal of the discharge transistor MNpath. The third switch 403A is coupled between the first voltage terminal VSSA and the second node N2, arranged to selectively provide the voltage at the first voltage terminal VSSA to the substrate of the discharge transistor MNpath. The fourth switch 404A is coupled between the second node N2 and the second voltage terminal VSSD, and arranged to selectively provide the voltage at the second voltage terminal VSSD to the substrate of the discharge transistor MNpath.

In this embodiment, when the voltage at the first voltage terminal VSSA is greater than the voltage at the second voltage terminal VSSD by a first predetermined value, the discharge transistor MNpath is conductive for discharging the current of the first voltage terminal VSSA to the second voltage terminal VSSD. When the voltage at the second voltage terminal VSSD is greater than the voltage at the first voltage terminal VSSA by a second predetermined value, the discharge transistor MNpath is conductive for discharging the current of the second voltage terminal VSSD to the first voltage terminal VSSA.

More specifically, when the voltage at the first voltage terminal VSSA is larger than the second voltage terminal VSSD by the first predetermined value, the first switch 401A turns on to provide the voltage at the first voltage terminal VSSA to the control terminal of the discharge transistor MNpath, and the fourth switch 404A turns on to provide the voltage at the second voltage terminal VSSD to the substrate of the discharge transistor MNpath. Namely, the first switch 401A turns on to provide the high voltage at the first voltage terminal VSSA to the control terminal of the discharge transistor MNpath, and the fourth switch 404A turns on to provide the low voltage at the second voltage terminal VSSD to the substrate of the discharge transistor MNpath, such that the discharge transistor MNpath is conductive. When the discharge transistor MNpath is conductive, the discharge transistor MNpath forms the discharge path. The current of the first voltage terminal VSSA is discharged to the second voltage terminal VSSD through the discharge path.

When the voltage at the second voltage terminal VSSD is greater than the voltage at the first voltage terminal VSSA by the second predetermined value, the second switch 402A is conductive for providing the voltage at the control terminal of the second voltage terminal VSSD to the discharge transistor MNpath, and the third switch 403A is conductive for providing the voltage at the first voltage terminal VSSA to the substrate of the discharge transistor MNpath. Namely, the second switch 402A turns on to provide the high voltage at the second voltage terminal VSSD to the control terminal of the discharge transistor MNpath, and the third switch 403A turns on to provide the low voltage at the first voltage terminal VSSA to the substrate of the discharge transistor MNpath, such that the discharge transistor MNpath is conductive. When the discharge transistor MNpath is conductive, the discharge transistor MNpath forms the discharge path. The current on the second voltage terminal VSSD is discharged to the first voltage terminal VSSA through the discharge path.

It should be noted that the first predetermined value is determined by the turn-on voltage of the first switch 401A and turn-on voltage of the discharge transistor MNpath, and the second predetermined value is determined by the turn-on voltage of the second switch 402A and the turn-on voltage of the discharge transistor MNpath. The circuit designer may determine the first predetermined value and the second predetermined value by the designs of the first switch 401A, the second switch 402A and the discharge transistor MNpath. In one embodiment of the present invention, the first predetermined value is the same as the second predetermined value, but it is not limited thereto. It should be noted that the circuit designer may clamp the voltage difference of the first voltage terminal VSSA and the second voltage terminal VSSD between the first predetermined value and the second predetermined value by the first predetermined value and the second predetermined value.

Figure 3:
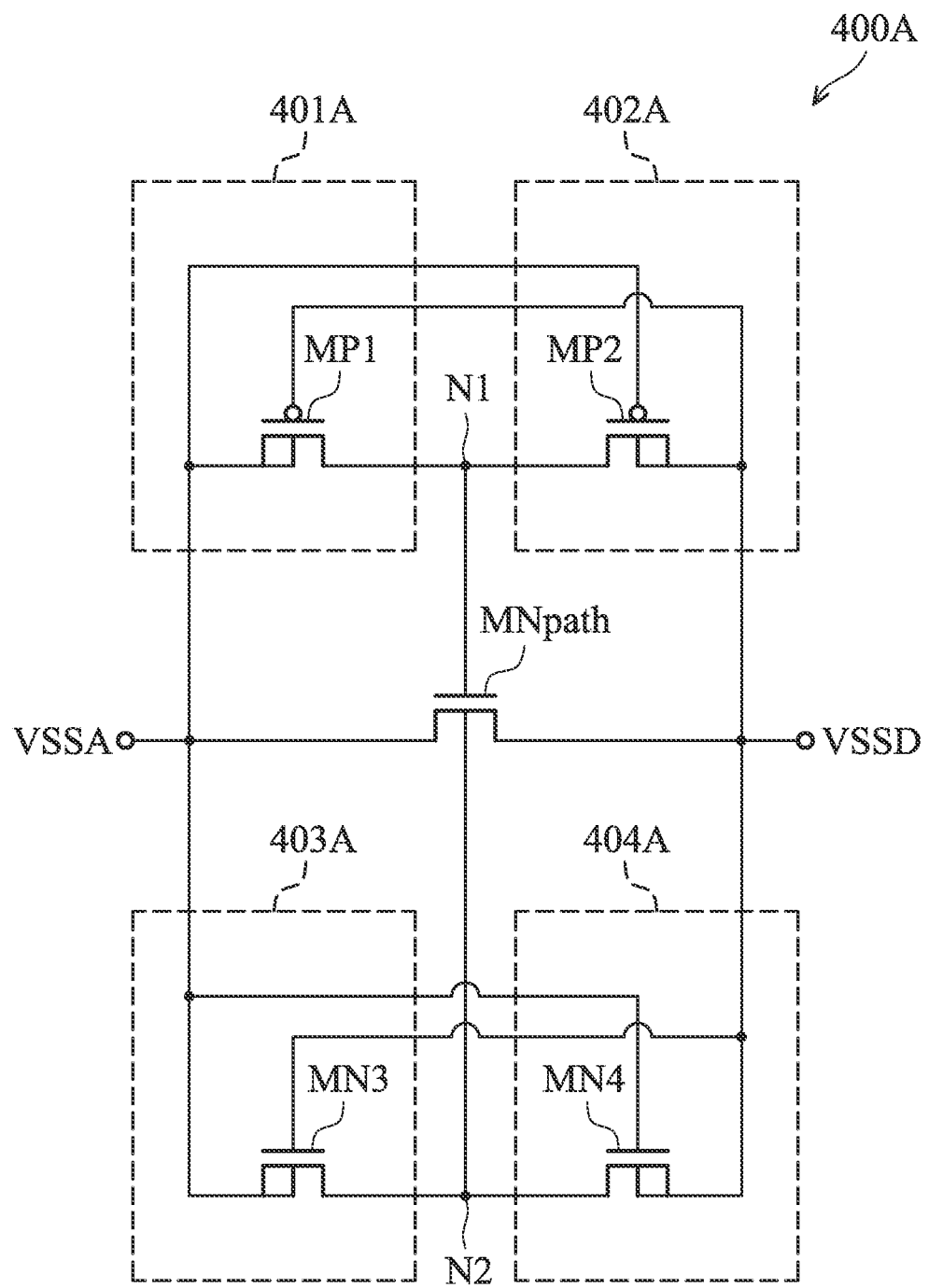
FIG. 3 is a schematic diagram illustrating an embodiment of the ESD protection circuit shown in FIG. 2 of the present invention.

FIG. 3 is a schematic diagram illustrating an embodiment of the ESD protection circuit shown in FIG. 2 of the present invention. In this embodiment, the first switch 401A is a first P-type field effect transistor MP1 having a first terminal coupled to the first voltage terminal VSSA, a second terminal coupled to the first node N1, a control terminal coupled to the second voltage terminal VSSD and a substrate coupled to the first voltage terminal VSSA. The second switch 402A is a second P-type field effect transistor MP2 having a first terminal coupled to the second voltage terminal VSSD, a second terminal coupled to the first node N1, a control terminal coupled to the first voltage terminal VSSA and a substrate coupled to the second voltage terminal VSSD. The third switch 403A is a third N-type field effect transistor MN3 has a first terminal coupled to the first voltage terminal VSSA, a second terminal coupled to the second node N2, a control terminal coupled to the second voltage terminal VSSD and a substrate coupled to the first voltage terminal VSSA. The fourth switch 404A is a fourth N-type field effect transistor MN4 having a first terminal coupled to the second voltage terminal VSSD, a second terminal coupled to the second node N2, a control terminal coupled to the first voltage terminal VSSA and a substrate coupled to the second voltage terminal VSSD, but it is not limited thereto.

In this embodiment, the first predetermined value is the higher one of the turn-on voltage of the first P-type field effect transistor MP1 and the turn-on voltage of the discharge transistor MNpath, and the turn-on voltage of the fourth N-type field effect transistor MN4 is less than the first predetermined value.

When the voltage at the first voltage terminal VSSA is greater than the voltage at the second voltage terminal VSSD by the first predetermined value, the control terminal of the first P-type field effect transistor MP1 receives the low voltage of the second voltage terminal VSSD, the first terminal and the substrate of the first P-type field effect transistor MP1 receive the high voltage of the first voltage terminal VSSA. Therefore, the first P-type field effect transistor MP1 is conductive.

When the voltage at the first voltage terminal VSSA is greater than the second voltage terminal VSSD by the first predetermined value, the control terminal of the fourth N-type field effect transistor MN4 receives the high voltage of the first voltage terminal VSSA, the substrate and the first terminal of the fourth N-type field effect transistor MN4 receive the low voltage of the second voltage terminal VSSD. Therefore, the fourth N-type field effect transistor MN4 is conductive.

Next, the control terminal of discharge transistor MNpath receives the high voltage of the first voltage terminal VSSA through the conductive first P-type field effect transistor MP1. The substrate of the discharge transistor MNpath receives the low voltage of the second voltage terminal VSSD through the conductive fourth N-type field effect transistor MN4. Therefore, the discharge transistor MNpath is conductive and forms the discharge path, such that the current of the first voltage terminal VSSA is discharged to the second voltage terminal VSSD through the discharge path.

It should be noted that, when the voltage at the first voltage terminal VSSA is greater than the voltage at the second voltage terminal VSSD by the first predetermined value, the control terminal of the second P-type field effect transistor MP2 receives the high voltage of the first voltage terminal VSSA, the first terminal and the substrate of the second P-type field effect transistor MP2 receive the low voltage of the second voltage terminal VSSD. Therefore, the second P-type field effect transistor MP2 is not conductive. When the voltage at the first voltage terminal VSSA is greater than the voltage at the second voltage terminal VSSD by the first predetermined value, the control terminal of the third N-type field effect transistor MN3 receives the low voltage of the second voltage terminal VSSD, and the substrate and the first terminal of the third N-type field effect transistor MN3 receive the high voltage of the first voltage terminal VSSA. Therefore, the third N-type field effect transistor MN3 is not conductive.

In this embodiment, the second predetermined value is the higher one of the turn-on voltage of the second P-type field effect transistor MP2 and the turn-on voltage of the discharge transistor MNpath, and the turn-on voltage of the third N-type field effect transistor MN3 is less than the second predetermined value.

When the voltage at the second voltage terminal VSSD is greater than the voltage at the first voltage terminal VSSA by the second predetermined value, the control terminal of the second P-type field effect transistor MP2 receives the low voltage of the first voltage terminal VSSA, and the first terminal and the substrate of the second P-type field effect transistor MP2 receive the high voltage of the second voltage terminal VSSD. Therefore, the second P-type field effect transistor MP2 is conductive.

When the voltage at the second voltage terminal VSSD is greater than the voltage at the first voltage terminal VSSA by the second predetermined value, the control terminal of the third N-type field effect transistor MN3 receives the high voltage of the second voltage terminal VSSD, the substrate and the first terminal of the third N-type field effect transistor MN3 receive the low voltage of the first voltage terminal VSSA. Therefore, the third N-type field effect transistor MN3 is conductive.

Next, the control terminal of the discharge transistor MNpath receives the high voltage of the second voltage terminal VSSD through the second P-type field effect transistor MP2. The substrate of the discharge transistor MNpath receives the low voltage of the first voltage terminal VSSA through the third N-type field effect transistor MN3. Therefore, the discharge transistor MNpath is conductive and forms the discharge path, such that the current of the second voltage terminal VSSD is discharged to the first voltage terminal VSSA through the discharge path.

It should be noted that, when the voltage at the second voltage terminal VSSD is greater than the voltage at the first voltage terminal VSSA by the second predetermined value, the control terminal of the first P-type field effect transistor MP1 receives the high voltage at the second voltage terminal VSSD, and the first terminal and the substrate of the first P-type field effect transistor MP1 receive the low voltage of the first voltage terminal VSSA. Therefore, the first P-type field effect transistor MP1 is not conductive. When the voltage at the second voltage terminal VSSD is greater than the voltage at the first voltage terminal VSSA by the second predetermined value, the control terminal of the fourth N-type field effect transistor MN4 receives the low voltage at the first voltage terminal VSSA, the substrate and the first terminal fourth N-type field effect transistor MN4 receive the high voltage at the second voltage terminal VSSD. Therefore, the fourth P-type field effect transistor MP4 is not conductive.

Figure 4:
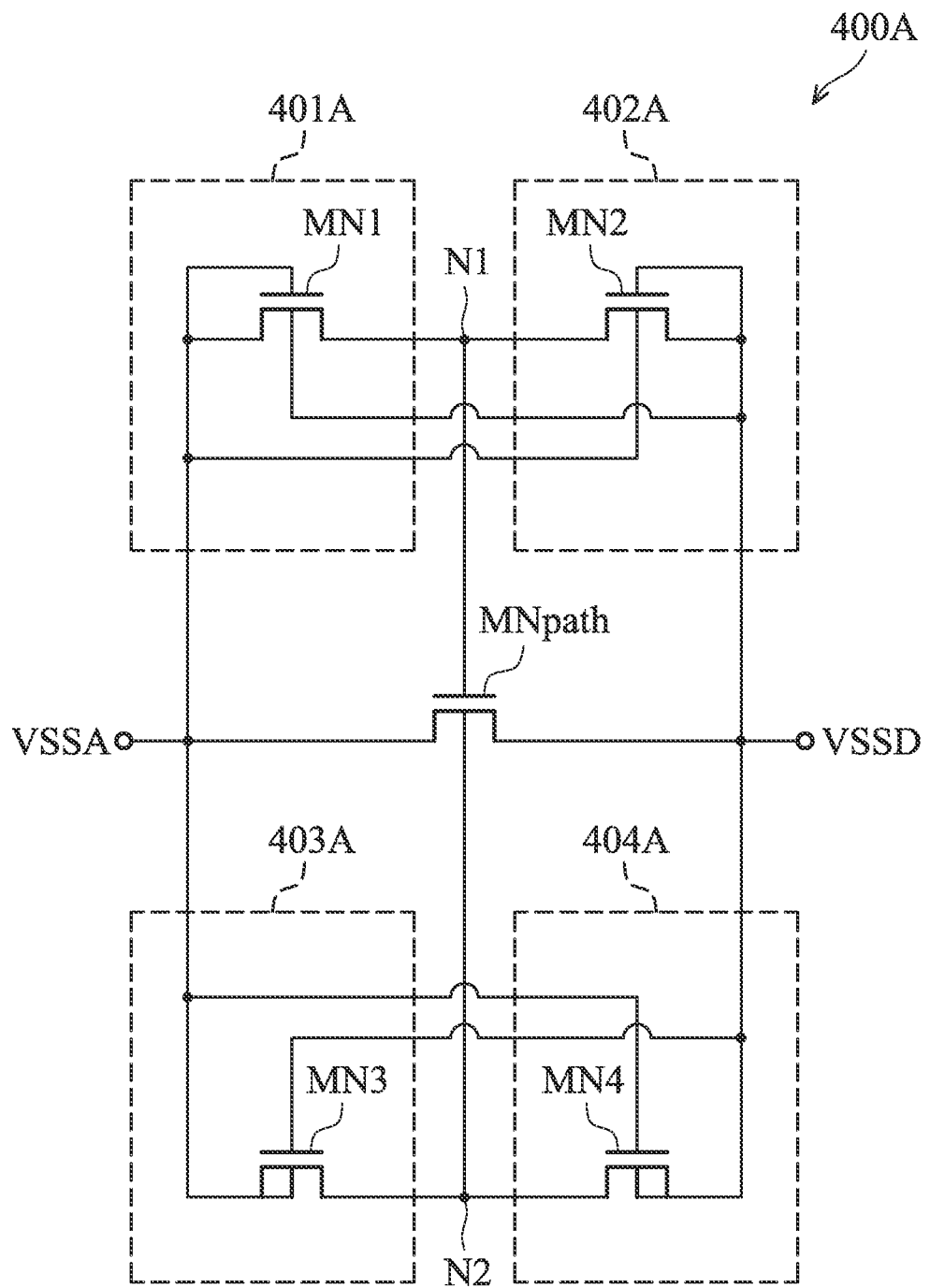
FIG. 4 is a schematic diagram illustrating another embodiment of the ESD protection circuit shown in FIG. 2 of the present invention.

FIG. 4 is a schematic diagram illustrating another embodiment of the ESD protection circuit shown in FIG. 2 of the present invention. In this embodiment, the first switch 401A is a first N-type field effect transistor MN1 having a first terminal coupled to the first voltage terminal VSSA, a second terminal coupled to the first node N1, a control terminal coupled to the first voltage terminal VSSA and a substrate coupled to the second voltage terminal VSSD. The second switch 402A is a second N-type field effect transistor MN2 having a first terminal coupled to the second voltage terminal VSSD, a second terminal coupled to the first node N1, a control terminal coupled to the second voltage terminal VSSD and a substrate coupled to the first voltage terminal VSSA. The third switch 403A is a third N-type field effect transistor MN3 having a first terminal coupled to the first voltage terminal VSSA, a second terminal coupled to the second node N2, a control terminal coupled to the second voltage terminal VSSD and a substrate coupled to the first voltage terminal VSSA. The fourth switch 404A is a fourth N-type field effect transistor MN4 having a first terminal coupled to the second voltage terminal VSSD, a second terminal coupled to the second node N2, a control terminal coupled to the first voltage terminal VSSA and a substrate coupled to the second voltage terminal VSSD, but it is not limited thereto.

In this embodiment, the first predetermined value is the sum of the turn-on voltage of the first N-type field effect transistor MN1 and the turn-on voltage of the discharge transistor MNpath, and the turn-on voltage of the fourth N-type field effect transistor MN4 is less than the first predetermined value.

When the voltage at the first voltage terminal VSSA is greater than the voltage at the second voltage terminal VSSD by the first predetermined value, the control terminal and the first terminal of the first N-type field effect transistor MN1 receive the high voltage of the first voltage terminal VSSA, the substrate of the first N-type field effect transistor MN1 receives the low voltage of the second voltage terminal VSSD. Therefore, the first N-type field effect transistor MN1 is conductive.

When the voltage at the first voltage terminal VSSA is greater than the voltage at the second voltage terminal VSSD by the first predetermined value, the fourth N-type field effect transistor MN4 is conductive. It should be noted that the details of the fourth N-type field effect transistor MN4 can be referred to in FIG. 3.

Next, the control terminal of the discharge transistor MNpath receives the high voltage of the first voltage terminal VSSA through the conductive first N-type field effect transistor MN1. The substrate of the discharge transistor MNpath receives the low voltage of the second voltage terminal VSSD through the conductive fourth N-type field effect transistor MN4. Therefore, the discharge transistor MNpath is conductive and forms the discharge path, such that the current of the first voltage terminal VSSA is discharged to the second voltage terminal VSSD through the discharge path.

It should be noted that when the voltage at the first voltage terminal VSSA is greater than the voltage at the second voltage terminal VSSD by the first predetermined value, the control terminal and the first terminal of the second N-type field effect transistor MN2 receive the low voltage of the second voltage terminal VSSD, the substrate of the second N-type field effect transistor MN2 receives the high voltage of the first voltage terminal VSSA. Therefore, the second N-type field effect transistor MN2 is not conductive. When the voltage at the first voltage terminal VSSA is greater than the voltage at the second voltage terminal VSSD by the first predetermined value, the third N-type field effect transistor MN3 is not conductive. It should be noted that the description of the third N-type field effect transistor MN3 can be referred to in FIG. 3.

In this embodiment, the second predetermined value is the sum of the turn-on voltage of the second N-type field effect transistor MN2 and the turn-on voltage of the discharge transistor MNpath, and the turn-on voltage of the third N-type field effect transistor MN3 is lower than the second predetermined value.

When the voltage at the second voltage terminal VSSD is greater than the voltage at the first voltage terminal VSSA by the second predetermined value, the control terminal and the first terminal of the second N-type field effect transistor MN2 receive the high voltage of the second voltage terminal VSSD, the substrate of the second N-type field effect transistor MN2 receive the low voltage of the first voltage terminal VSSA. Therefore, the second N-type field effect transistor MN2 is conductive.

When the voltage at the second voltage terminal VSSD is greater than the voltage at the first voltage terminal VSSA by the second predetermined value, the third N-type field effect transistor MN3 is conductive. It should be noted that the description of the third N-type field effect transistor MN3 can be referred to FIG. 3.

Next, the control terminal of the discharge transistor MNpath receives the high voltage of the second voltage terminal VSSD through the conductive second N-type field effect transistor MN2. The substrate of the discharge transistor MNpath receives the low voltage of the first voltage terminal VSSA through the conductive third N-type field effect transistor MN3. Therefore, the discharge transistor MNpath is conductive and forms the discharge path, such that the current of the second voltage terminal VSSD is discharged to the first voltage terminal VSSA of the discharge path.

It should be noted that when the voltage at the second voltage terminal VSSD is greater than the voltage at the first voltage terminal VSSA by the second predetermined value, the control terminal and the first terminal of the first N-type field effect transistor MN1 receive the low voltage at the first voltage terminal VSSA, the first terminal and the substrate of the first N-type field effect transistor MN1 receive the high voltage of the second voltage terminal VSSD. Therefore, the first N-type field effect transistor MN1 is not conductive. When the voltage at the second voltage terminal VSSD is greater than the voltage at the first voltage terminal VSSA by the second predetermined value, the fourth N-type field effect transistor MN4 is not conductive. It should be noted that the description of the fourth N-type field effect transistor MN4 can be referred to FIG. 3.

Figure 5:
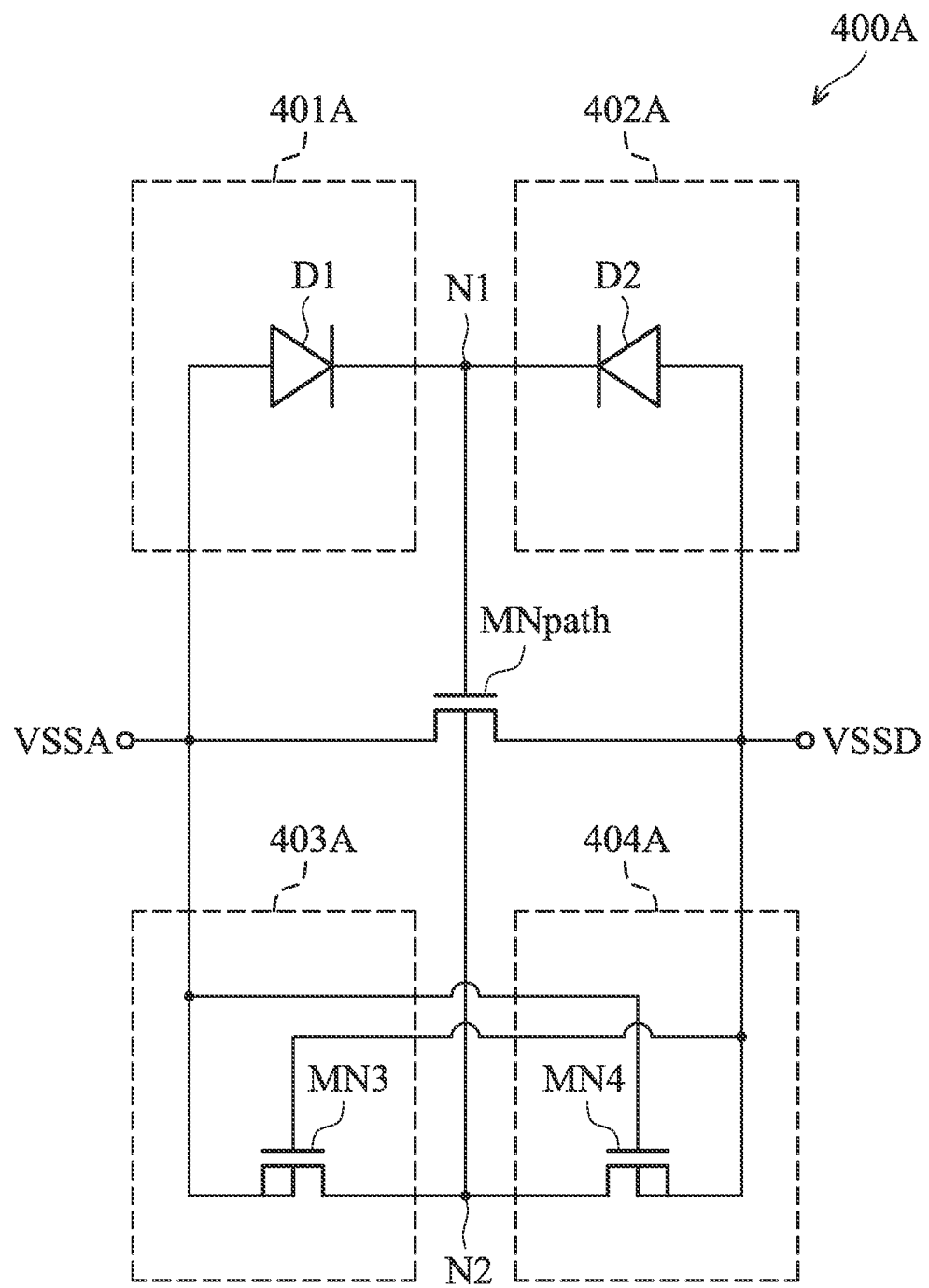
FIG. 5 is a schematic diagram illustrating another embodiment of the ESD protection circuit shown in FIG. 2 of the present invention.

FIG. 5 is a schematic diagram illustrating another embodiment of the ESD protection circuit shown in FIG. 2 of the present invention. In this embodiment, the first switch 401A is a first diode D1 having an anode terminal coupled to the first voltage terminal VSSA, a cathode terminal coupled to the first node N1. The second switch 402A is a second diode D2 having an anode terminal coupled to the second voltage terminal VSSD, a cathode terminal coupled to the first node N1. The third switch 403A is a third N-type field effect transistor MN3 having a first terminal coupled to the first voltage terminal VSSA, a second terminal coupled to the second node N2, a control terminal coupled to the second voltage terminal VSSD and a substrate coupled to the first voltage terminal VSSA. The fourth switch 404A is a fourth N-type field effect transistor MN4 having a first terminal coupled to the second voltage terminal VSSD, a second terminal coupled to the second node N2, a control terminal coupled to the first voltage terminal VSSA and a substrate coupled to the second voltage terminal VSSD, but it is not limited thereto.

In this embodiment, the first predetermined value is the sum of the turn-on voltage of the first diode D1 and the turn-on voltage of the discharge transistor MNpath, and the turn-on voltage of the fourth N-type field effect transistor MN4 is lower than the first predetermined value.

When the voltage at the first voltage terminal VSSA is greater than the voltage at the second voltage terminal VSSD by the first predetermined value, the anode terminal of the first diode D1 receives the high voltage of the first voltage terminal VSSA. Therefore, the first diode D1 is conductive.

When the voltage at the first voltage terminal VSSA is greater than the voltage at the second voltage terminal VSSD by the first predetermined value, the fourth N-type field effect transistor MN4 is conductive. It should be noted that the description of the fourth N-type field effect transistor MN4 can be referred to FIG. 3.

Next, the control terminal of the discharge transistor MNpath receives the high voltage of the first voltage terminal VSSA through the conductive first diode D1. The substrate of the discharge transistor MNpath receives the low voltage of the second voltage terminal VSSD through the conductive fourth N-type field effect transistor MN4. Therefore, the discharge transistor MNpath is conductive and forms a discharge path, such that the current of the first voltage terminal VSSA is discharged to the second voltage terminal VSSD through the discharge path.

It should be noted that when the voltage at the first voltage terminal VSSA is greater than the voltage at the second voltage terminal VSSD by the first predetermined value, the anode terminal of the second diode D2 receives the low voltage of the second voltage terminal VSSD. Therefore, the second diode D2 is not conductive. When the voltage at the first voltage terminal VSSA is greater than the voltage at the second voltage terminal VSSD by the first predetermined value, the third N-type field effect transistor MN3 is not conductive. It should be noted that the description of the third N-type field effect transistor MN3 can be referred to in FIG. 3.

In this embodiment, the second predetermined value is the sum of the turn-on voltage of the second diode D2 and the turn-on voltage of the discharge transistor MNpath, and the turn-on voltage of the third N-type field effect transistor MN3 is lower than the second predetermined value.

When the voltage at the second voltage terminal VSSD is greater than the voltage at the first voltage terminal VSSA by the second predetermined value, the anode terminal of the second diode D2 receives the high voltage of the second voltage terminal VSSD. Therefore, the second N-type field effect transistor MN2 is conductive.

When second voltage terminal VSSD is greater than the voltage at the first voltage terminal VSSA by the second predetermined value, the third N-type field effect transistor MN3 is conductive. It should be noted that the description of the third N-type field effect transistor MN3 can be referred to in FIG. 3.

Next, the control terminal of the discharge transistor MNpath receives the high voltage of the second voltage terminal VSSD through the conductive second diode D2. The substrate of the discharge transistor MNpath receives the low voltage of the first voltage terminal VSSA through the conductive third N-type field effect transistor MN3. Therefore, the discharge transistor MNpath is conductive and forms the discharge path, such that the current of the second voltage terminal VSSD is discharged to the first voltage terminal VSSA through the discharge path.

It should be noted that when the second voltage terminal VSSD is greater than the voltage at the first voltage terminal VSSA by the second predetermined value, the anode terminal of the first diode D1 receives the low voltage of the first voltage terminal VSSA, therefore, the first diode D1 is not conductive. When the second voltage terminal VSSD is greater than the voltage at the first voltage terminal VSSA by the second predetermined value, the fourth N-type field effect transistor MN4 is not conductive. It should be noted that the description of the fourth N-type field effect transistor MN4 can be referred to in FIG. 3.

Figure 6:
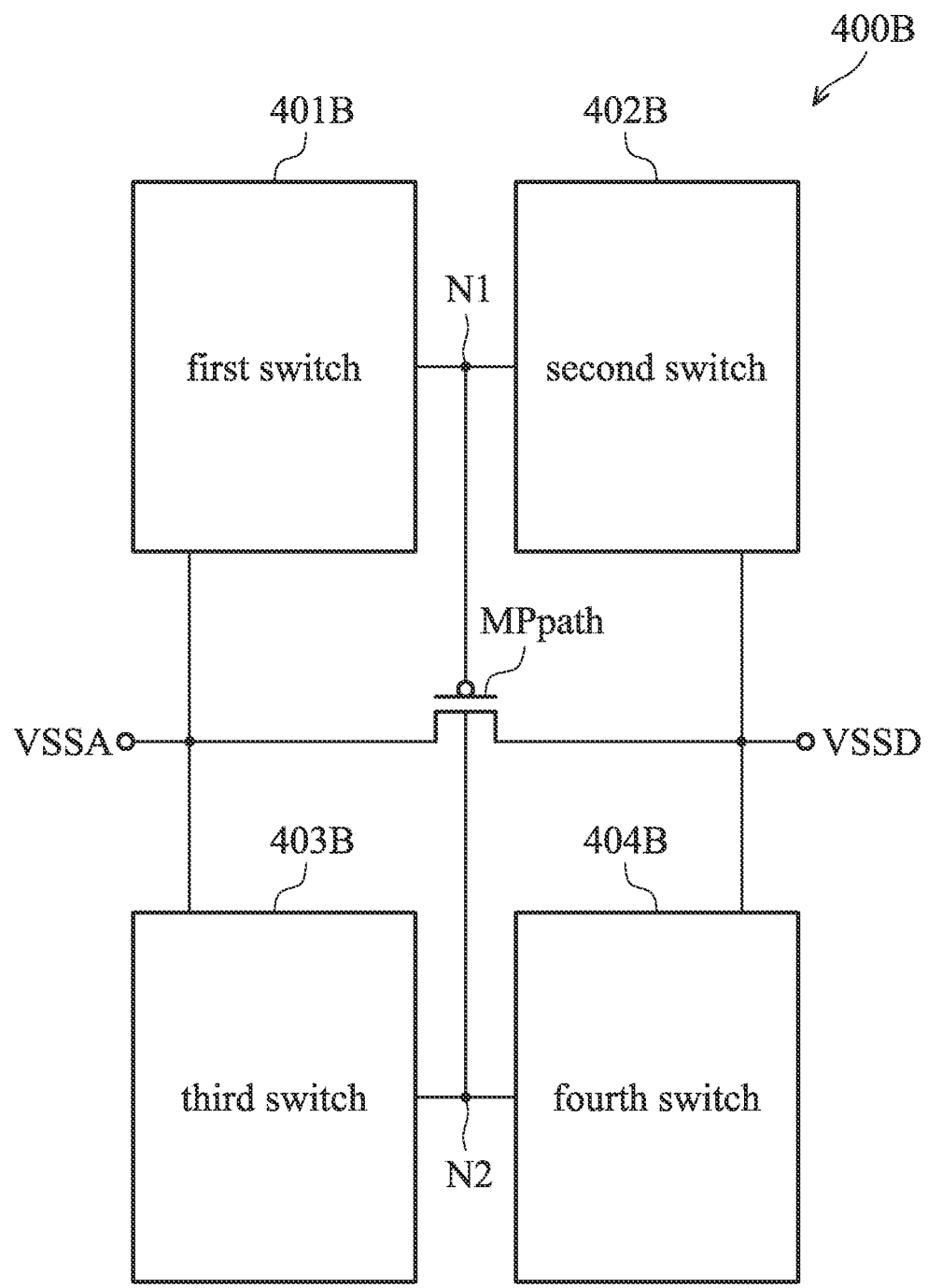
FIG. 6 is a schematic diagram illustrating another embodiment of an ESD protection circuit of the electronic system shown in FIG. 1 of the present invention.

FIG. 6 is a schematic diagram illustrating another embodiment of an ESD protection circuit of the electronic system shown in FIG. 1 of the present invention. The ESD protection circuit 400B includes a first voltage terminal VSSA, a second voltage terminal VSSD, a discharge transistor MPpath, a first switch 401B, a second switch 402B, a third switch 403B and a fourth switch 404B. The discharge transistor MPpath has a first terminal coupled to the first voltage terminal VSSA, a second terminal coupled to the second voltage terminal VSSD, a control terminal coupled to a first node N1 and a substrate coupled to a second node N2, wherein the discharge transistor MPpath forms a discharge path between the first voltage terminal VSSA and the second voltage terminal VSSD. It should be noted that in this embodiment, the discharge transistor MPpath is a P-type field effect transistor. The first switch 401B is coupled between the first voltage terminal VSSA and the first node N1, and arranged to selectively provide the voltage at the first voltage terminal VSSA to the control terminal of the discharge transistor MPpath. The second switch 402B is coupled between the first node N1 and the second voltage terminal VSSD, and arranged to selectively provide the voltage of the second voltage terminal VSSD to the control terminal of the discharge transistor MPpath. The third switch 403B is coupled between the first voltage terminal VSSA and the second node N2, and arranged to selectively provide the voltage of the first voltage terminal VSSA to the substrate of the discharge transistor MPpath. The fourth switch 404B is coupled between the second node N2 and the second voltage terminal VSSD, and arranged to selectively provide the voltage of the second voltage terminal VSSD to the substrate of the discharge transistor MPpath.

In this embodiment, when the voltage at the first voltage terminal VSSA is greater than the voltage at the second voltage terminal VSSD by the first predetermined value, the discharge transistor MPpath is conductive for discharging the current of the first voltage terminal VSSA to the second voltage terminal VSSD. When the second voltage terminal VSSD is greater than the voltage at the first voltage terminal VSSA by a second predetermined value, the discharge transistor MPpath is conductive for discharging the current of the second voltage terminal VSSD to the first voltage terminal VSSA.

More specifically, when the voltage at the first voltage terminal VSSA is greater than the voltage at the second voltage terminal VSSD by the first predetermined value, the second switch 402B turns on to provide the voltage of the second voltage terminal VSSD to the control terminal of the discharge transistor MPpath, and the third switch 403B turns on to provide the voltage of the first voltage terminal VSSA to the substrate of the discharge transistor MPpath. Namely, the second switch 402B turns on to provide the low voltage at the second voltage terminal VSSD to the control terminal of the discharge transistor MPpath, and the third switch 403B turns on to provide the high voltage at the first voltage terminal VSSA to the substrate of the discharge transistor MPpath, such that discharge transistor MPpath is conductive. When the discharge transistor MPpath is conductive, the discharge transistor MPpath forms the discharge path. The current of the first voltage terminal VSSA is discharged to the second voltage terminal VSSD through the discharge path.

When the second voltage terminal VSSD is greater than the voltage at the first voltage terminal VSSA by the second predetermined value, the first switch 401B is conductive for providing the voltage at the first voltage terminal VSSA to the control terminal of the discharge transistor MPpath, and the fourth switch 404B is conductive for providing the voltage at the second voltage terminal VSSD to the substrate of the discharge transistor MPpath. Namely, the first switch 401B turns on to provide the low voltage of the first voltage terminal VSSA to the control terminal of the discharge transistor MPpath, and the fourth switch 404B turns on to provide the high voltage of the second voltage terminal VSSD to the substrate of the discharge transistor MPpath, such that the discharge transistor MPpath is conductive. When the discharge transistor MPpath is conductive, the discharge transistor MPpath forms the discharge path. The current of the second voltage terminal VSSD is discharged to the first voltage terminal VSSA through the discharge path.

It should be noted that the first predetermined value is determined by the turn-on voltage of the second switch 402B and the turn-on voltage of the discharge transistor MPpath, and the second predetermined value is determined by the turn-on voltage of the first switch 401B and the turn-on voltage of the discharge transistor MPpath. The circuit designer may determine the first predetermined value and the second predetermined value by the designs of the first switch 401B, the second switch 402B and the discharge transistor MPpath. In one embodiment of the present invention, the first predetermined value is the same as the second predetermined value, but it is not limited thereto. It should be noted that the circuit designer may clamp the voltage difference of the first voltage terminal VSSA and the second voltage terminal VSSD between the first predetermined value and the second predetermined value by the first predetermined value and the second predetermined value.

Figure 7:
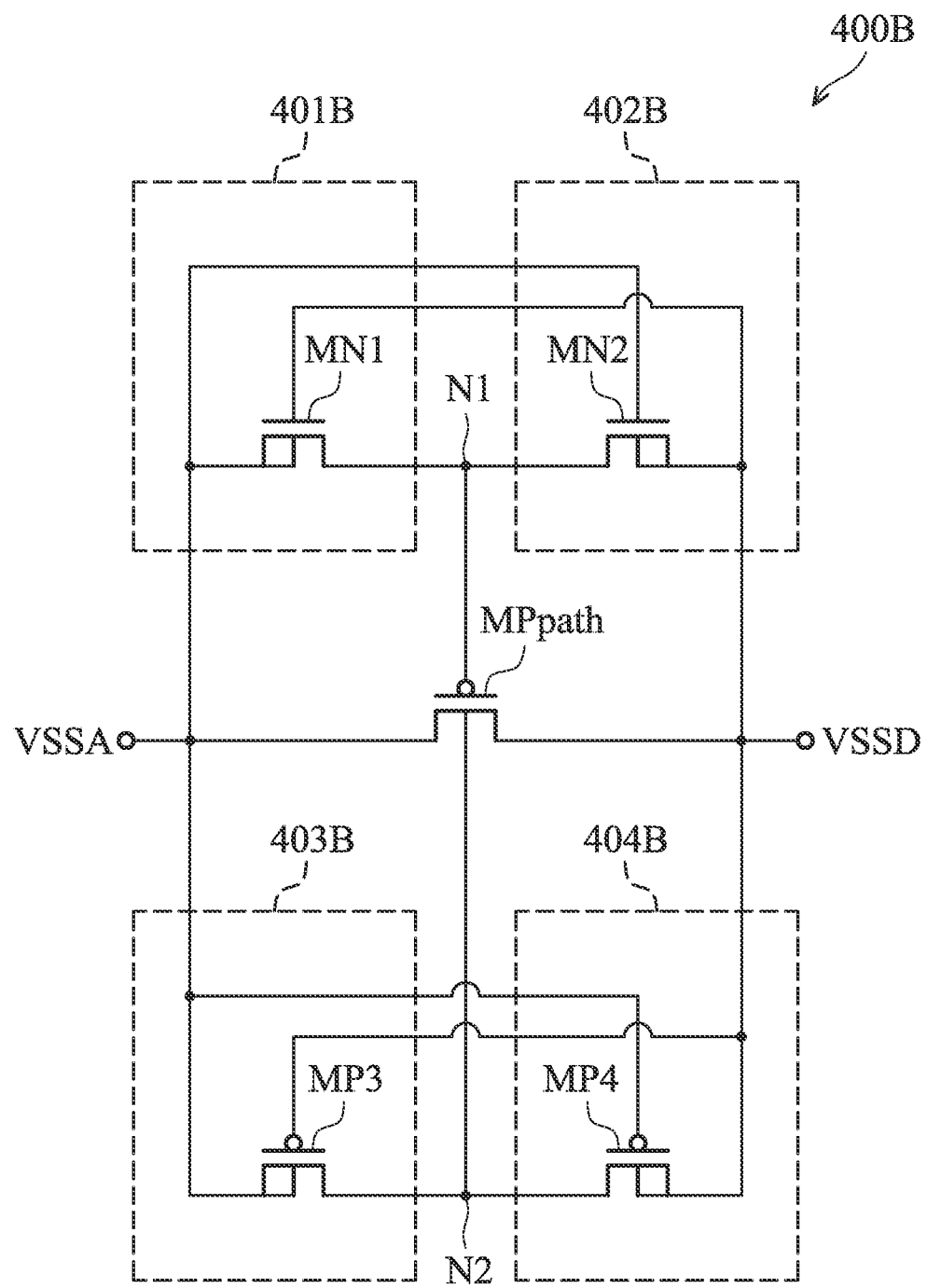
FIG. 7 is a schematic diagram illustrating an embodiment of the ESD protection circuit shown in FIG. 6 of the present invention.

FIG. 7 is a schematic diagram illustrating an embodiment of the ESD protection circuit shown in FIG. 6 of the present invention. In this embodiment, the first switch 401B is a first N-type field effect transistor MN1 having a first terminal coupled to the first voltage terminal VSSA, a second terminal coupled to the first node N1, a control terminal coupled to the second voltage terminal VSSD and a substrate coupled to the first voltage terminal VSSA. The second switch 402B is a second N-type field effect transistor MN2 having a first terminal coupled to the second voltage terminal VSSD, a second terminal coupled to the first node N1, a control terminal coupled to the first voltage terminal VSSA and a substrate coupled to the second voltage terminal VSSD. The third switch 403B is a third P-type field effect transistor MP3 having a first terminal coupled to the first voltage terminal VSSA, a second terminal coupled to the second node N2, a control terminal coupled to the second voltage terminal VSSD and a substrate coupled to the first voltage terminal VSSA. The fourth switch is a fourth P-type field effect transistor MP4 having a first terminal coupled to the second voltage terminal VSSD, a second terminal coupled to the second node N2, a control terminal coupled to the first voltage terminal VSSA and a substrate coupled to the second voltage terminal VSSD, but it is not limited thereto.

In this embodiment, the first predetermined value is the higher one of the turn-on voltage of the second N-type field effect transistor MN2 and the turn-on voltage of the discharge transistor MPpath, the turn-on voltage of the third P-type field effect transistor MP3 being lower than the first predetermined value.

When the voltage at the first voltage terminal VSSA is greater than the voltage at the second voltage terminal VSSD by the first predetermined value, the control terminal of the second N-type field effect transistor MN2 receives the high voltage of the first voltage terminal VSSA, the first terminal and the substrate of the second N-type field effect transistor MN2 receive the low voltage of the second voltage terminal VSSD. Therefore, the second N-type field effect transistor MN2 is conductive.

When the voltage at the first voltage terminal VSSA is greater than the voltage at the second voltage terminal VSSD by the first predetermined value, the control terminal of the third P-type field effect transistor MP3 receives the low voltage of the second voltage terminal VSSD, the substrate and the first terminal of the third P-type field effect transistor MP3 receive the high voltage of the first voltage terminal VSSA. Therefore, the third P-type field effect transistor MP3 is conductive.

Next, the control terminal of the discharge transistor MPpath receives the low voltage of the second voltage terminal VSSD through the conductive second N-type field effect transistor MN2. The substrate of the discharge transistor MPpath receives the high voltage of the first voltage terminal VSSA through the conductive third P-type field effect transistor MP3. Therefore, the discharge transistor MPpath is conductive and forms the discharge path, such that the current of the first voltage terminal VSSA is discharged to the second voltage terminal VSSD through the discharge path.

It should be noted that when the voltage at the first voltage terminal VSSA is greater than the voltage at the second voltage terminal VSSD by the first predetermined value, the control terminal of the first N-type field effect transistor MN1 receives the low voltage of the second voltage terminal VSSD, the first terminal and the substrate of the first N-type field effect transistor MN1 receive the high voltage of the first voltage terminal VSSA. Therefore, the first N-type field effect transistor MN1 is not conductive. When the voltage at the first voltage terminal VSSA is greater than the voltage at the second voltage terminal VSSD by the first predetermined value, the control terminal of the fourth P-type field effect transistor MP4 receives the high voltage of the first voltage terminal VSSA, the substrate and the first terminal of the fourth P-type field effect transistor MP4 receive the low voltage of the second voltage terminal VSSD. Therefore, the fourth P-type field effect transistor MP4 is not conductive.

In this embodiment, the second predetermined value is the higher one of the turn-on voltage of the first N-type field effect transistor MN1 and the turn-on voltage of the discharge transistor MPpath, the turn-on voltage of the fourth P-type field effect transistor MP4 is lower than the second predetermined value.

When the second voltage terminal VSSD is greater than the voltage at the first voltage terminal VSSA by the second predetermined value, the control terminal of the first N-type field effect transistor MN1 receives the high voltage of the second voltage terminal VSSD, the first terminal and the substrate first N-type field effect transistor MN1 receive the low voltage of the first voltage terminal VSSA. Therefore, the first N-type field effect transistor MN1 is conductive.

When the second voltage terminal VSSD is greater than the voltage at the first voltage terminal VSSA by the second predetermined value, the control terminal of the fourth P-type field effect transistor MP4 receives the low voltage of the first voltage terminal VSSA, the substrate and the first terminal fourth P-type field effect transistor MP4 receive the high voltage of the second voltage terminal VSSD. Therefore, the fourth P-type field effect transistor MP4 is conductive.

Next, the control terminal of the discharge transistor MPpath receives the low voltage of the first voltage terminal VSSA through the conductive first N-type field effect transistor MN1. The substrate of the discharge transistor MPpath receives the high voltage of the second voltage terminal VSSD through the conductive fourth P-type field effect transistor MP4. Therefore, the discharge transistor MPpath is conductive and forms the discharge path, such that the current of the second voltage terminal VSSD is discharged to the first voltage terminal VSSA through the discharge path.

It should be noted that when the second voltage terminal VSSD is greater than the voltage at the first voltage terminal VSSA by the second predetermined value, the control terminal of the second N-type field effect transistor MN2 receives the low voltage of the first voltage terminal VSSA, the first terminal and the substrate of the second N-type field effect transistor MN2 receive the high voltage of the second voltage terminal VSSD. Therefore, the second N-type field effect transistor MN2 is not conductive. When the second voltage terminal VSSD is greater than the voltage at the first voltage terminal VSSA by the second predetermined value, the control terminal of the third P-type field effect transistor MP3 receives the high voltage of the second voltage terminal VSSD, the substrate and the first terminal of the third P-type field effect transistor MP3 receive the low voltage of the first voltage terminal VSSA. Therefore, the third P-type field effect transistor MP3 is not conductive.

Figure 8:
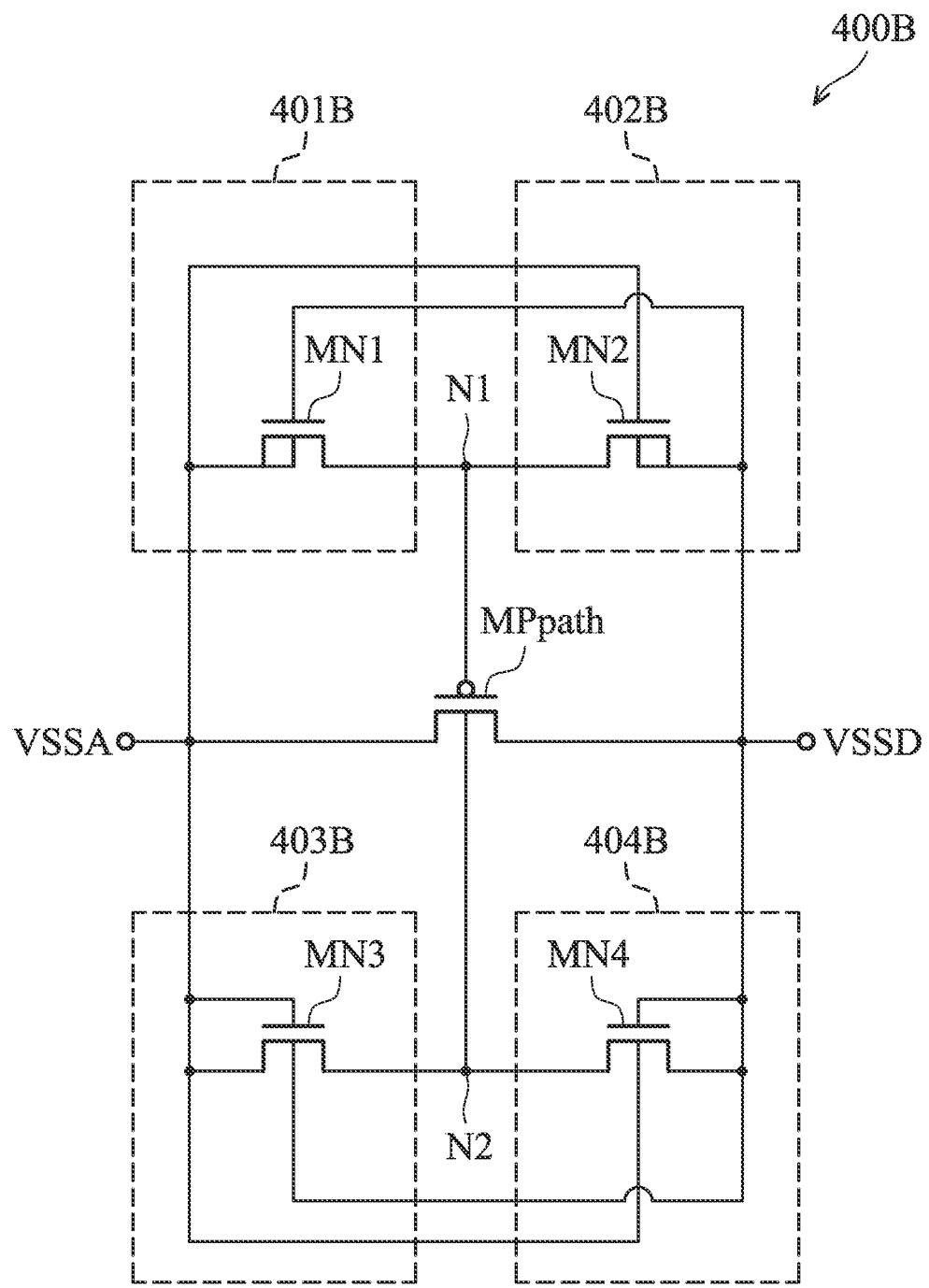
FIG. 8 is a schematic diagram illustrating another embodiment of the ESD protection circuit shown in FIG. 6 of the present invention.

FIG. 8 is a schematic diagram illustrating another embodiment of the ESD protection circuit shown in FIG. 6 of the present invention. In this embodiment, the first switch 401B is a first N-type field effect transistor MN1 having a first terminal coupled to the first voltage terminal VSSA, a second terminal coupled to the first node N1, a control terminal coupled to the second voltage terminal VSSD and a substrate coupled to the first voltage terminal VSSA. The second switch 402B is a second N-type field effect transistor MN2 having a first terminal coupled to the second voltage terminal VSSD, a second terminal coupled to the first node N1, a control terminal coupled to the first voltage terminal VSSA and a substrate coupled to the second voltage terminal VSSD. The third switch 403B is a third N-type field effect transistor MN3 having a first terminal coupled to the first voltage terminal VSSA, a second terminal coupled to the second node N2, a control terminal coupled to the first voltage terminal VSSA and a substrate coupled to the second voltage terminal VSSD. The fourth switch 404B is a fourth N-type field effect transistor MN4 having the first terminal coupled to the second voltage terminal VSSD, a second terminal coupled to the second node N2, a control terminal coupled to the second voltage terminal VSSD and a substrate coupled to the first voltage terminal VSSA, but it is not limited thereto.

In this embodiment, the first predetermined value is the higher one of the turn-on voltage of the second N-type field effect transistor MN2 and the turn-on voltage of the discharge transistor MPpath, and the turn-on voltage of the third N-type field effect transistor MN3 is lower than the turn-on voltage of the first predetermined value.

When the voltage at the first voltage terminal VSSA is greater than the voltage at the second voltage terminal VSSD by the first predetermined value, the second N-type field effect transistor MN2 is conductive. It should be noted that the description of the second N-type field effect transistor MN2 can be referred to in FIG. 7.

When the voltage at the first voltage terminal VSSA is greater than the voltage at the second voltage terminal VSSD by the first predetermined value, the control terminal and the first terminal of the third N-type field effect transistor MN3 receive the high voltage of the first voltage terminal VSSA, the substrate of the third N-type field effect transistor MN3 receive the low voltage of the second voltage terminal VSSD. Therefore, the third N-type field effect transistor MN3 is conductive.

Next, the control terminal of the discharge transistor MPpath receives the low voltage of the second voltage terminal VSSD through the conductive second N-type field effect transistor MN2. The substrate of the discharge transistor MPpath receives the high voltage of the first voltage terminal VSSA through the conductive third N-type field effect transistor MN3. Therefore, the discharge transistor MPpath turns on and forms the discharge path, such that the current of the first voltage terminal VSSA is discharged to the second voltage terminal VSSD through the discharge path.

It should be noted that when the voltage at the first voltage terminal VSSA is greater than the voltage at the second voltage terminal VSSD by the first predetermined value, the first N-type field effect transistor MN1 is not conductive. It should be noted that the description of the first N-type field effect transistor MN1 can be referred to in FIG. 7. When the voltage at the first voltage terminal VSSA is greater than the voltage at the second voltage terminal VSSD by the first predetermined value, the control terminal and the first terminal of the fourth N-type field effect transistor MN4 receive the low voltage of the second voltage terminal VSSD, the substrate of the fourth N-type field effect transistor MN4 receives the high voltage of the first voltage terminal VSSA. Therefore, the fourth N-type field effect transistor MN4 is not conductive.

In this embodiment, the second predetermined value is the higher one of the turn-on voltage of the first N-type field effect transistor MN1 and the turn-on voltage of the discharge transistor MPpath, the turn-on voltage of the fourth N-type field effect transistor MN4 is lower than the second predetermined value.

When the second voltage terminal VSSD is greater than the voltage at the first voltage terminal VSSA by the second predetermined value, the first N-type field effect transistor MN1 is conductive. It should be noted that the description of the first N-type field effect transistor MN1 can be referred to in FIG. 7.

When the second voltage terminal VSSD is greater than the voltage at the first voltage terminal VSSA by the second predetermined value, the control terminal and the first terminal of the fourth N-type field effect transistor MN4 receive the high voltage of the second voltage terminal VSSD, the substrate of the fourth N-type field effect transistor MN4 receive the high voltage of the first voltage terminal VSSA. Therefore, the fourth N-type field effect transistor MN4 is conductive.

Next, the control terminal of the discharge transistor MPpath receives the low voltage of the first voltage terminal VSSA through the conductive first N-type field effect transistor MN1. The substrate of the discharge transistor MPpath receives the high voltage of the second voltage terminal VSSD through the conductive fourth N-type field effect transistor MN4. Therefore, the discharge transistor MPpath turns on and forms the discharge path, such that the current of the second voltage terminal VSSD is discharged to the first voltage terminal VSSA through the discharge path.

It should be noted that when the second voltage terminal VSSD is greater than the voltage at the first voltage terminal VSSA by the second predetermined value, the second N-type field effect transistor MN2 is not conductive. It should be noted that the description of the second N-type field effect transistor MN2 can be referred to in FIG. 7. When the second voltage terminal VSSD is greater than the voltage at the first voltage terminal VSSA by the second predetermined value, the control terminal and the first terminal of the third N-type field effect transistor MN3 receive the low voltage of the first voltage terminal VSSA, the substrate of the third N-type field effect transistor MN3 receives the high voltage of the second voltage terminal VSSD. Therefore, the third N-type field effect transistor MN3 is not conductive.

Figure 9:
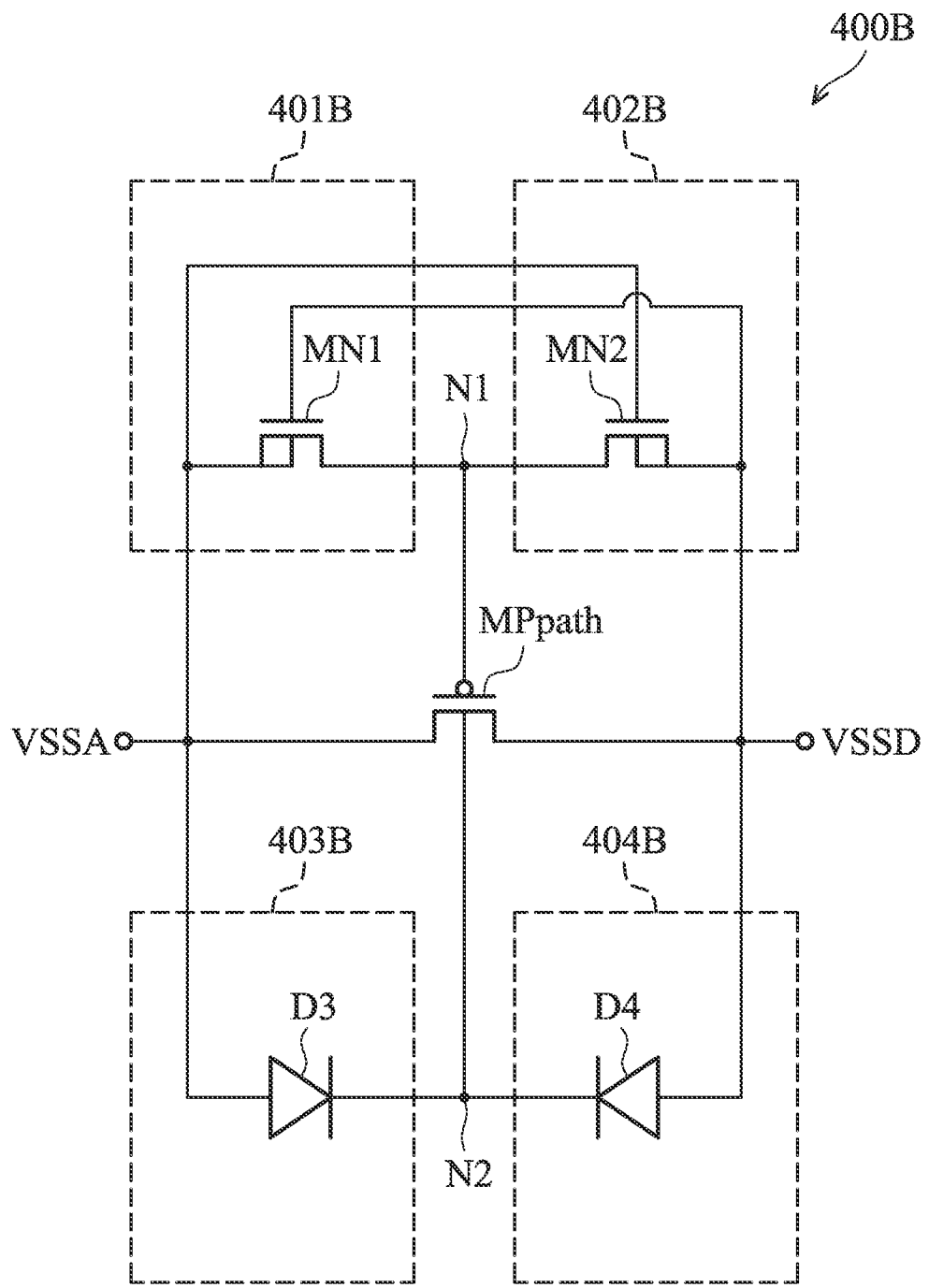
FIG. 9 is a schematic diagram illustrating another embodiment of the ESD protection circuit shown in FIG. 6 of the present invention.

FIG. 9 is a schematic diagram illustrating another embodiment of the ESD protection circuit shown in FIG. 6 of the present invention. In this embodiment, the first switch 401B is a first N-type field effect transistor MN1 having a first terminal coupled to the first voltage terminal VSSA, a second terminal coupled to the first node N1, a control terminal coupled to the second voltage terminal VSSD and a substrate coupled to the first voltage terminal VSSA. The second switch 402B is a second N-type field effect transistor MN2 having a first terminal coupled to the second voltage terminal VSSD, a second terminal coupled to the first node N1, a control terminal coupled to the first voltage terminal VSSA and a substrate coupled to the second voltage terminal VSSD.

The third switch 403B is a third diode D3 having an anode terminal coupled to the first voltage terminal VSSA, a cathode terminal coupled to the second node N2. The fourth switch 404B is a fourth diode D4 having an anode terminal coupled to the second voltage terminal VSSD, a cathode terminal coupled to the second node N2.

In this embodiment, the first predetermined value is the higher one of the turn-on voltage of the second N-type field effect transistor MN2 and the turn-on voltage of the discharge transistor MPpath, and the turn-on voltage of the third diode D3 is lower than the first predetermined value.

When the voltage at the first voltage terminal VSSA is greater than the voltage at the second voltage terminal VSSD by the first predetermined value, the second N-type field effect transistor MN2 is conductive. It should be noted that the description of the second N-type field effect transistor MN2 can be referred to in FIG. 7.

When the voltage at the first voltage terminal VSSA is greater than the voltage at the second voltage terminal VSSD by the first predetermined value, the anode terminal of the third diode D3 receives the high voltage of the first voltage terminal VSSA. Therefore, the third diode D3 is conductive.

Next, the control terminal of the discharge transistor MPpath receives the low voltage of the second voltage terminal VSSD through the conductive second N-type field effect transistor MN2. The substrate of the discharge transistor MPpath receives the high voltage of the first voltage terminal VSSA through the conductive third diode D3. Therefore, the discharge transistor MPpath turns on and forms the discharge path, such that the current of the first voltage terminal VSSA is discharged to the second voltage terminal VSSD through the discharge path.

It should be noted that when the voltage at the first voltage terminal VSSA is greater than the voltage at the second voltage terminal VSSD by the first predetermined value, the first N-type field effect transistor MN1 is not conductive. It should be noted that the details of the first N-type field effect transistor MN1 can be referred to in FIG. 7. When the voltage at the first voltage terminal VSSA is greater than the voltage at the second voltage terminal VSSD by the first predetermined value, the anode terminal of the fourth diode D4 receives the low voltage of the second voltage terminal VSSD. Therefore, the fourth diode D4 is not conductive.

In this embodiment, the second predetermined value is the higher one of the turn-on voltage of the first N-type field effect transistor MN1 and the turn-on voltage of the discharge transistor MPpath, and the turn-on voltage of the fourth diode D4 is lower than the second predetermined value.

When the second voltage terminal VSSD is greater than the voltage at the first voltage terminal VSSA by the second predetermined value, the first N-type field effect transistor MN1 is conductive. It should be noted that the details of the first N-type field effect transistor MN1 can be referred to in FIG. 7.

When second voltage terminal VSSD is greater than the voltage at the first voltage terminal VSSA by the second predetermined value, the anode terminal of the fourth diode D4 receives the high voltage of the second voltage terminal VSSD. Therefore, the fourth diode D4 is conductive.

Next, the control terminal of the discharge transistor MPpath receives the low voltage of the first voltage terminal VSSA through the conductive first N-type field effect transistor MN1. The substrate of the discharge transistor MPpath receives the high voltage of the second voltage terminal VSSD through the conductive fourth diode D4. Therefore, the discharge transistor MPpath turns on and forms the discharge path, such that the current of the second voltage terminal VSSD is discharged to the first voltage terminal VSSA through the discharge path.

It should be noted that when the second voltage terminal VSSD is greater than the voltage at the first voltage terminal VSSA by the second predetermined value, the second N-type field effect transistor MN2 is not conductive. It should be noted that the details of the second N-type field effect transistor MN2 can be referred in to FIG. 7. When the second voltage terminal VSSD is greater than the voltage at the first voltage terminal VSSA by the second predetermined value, the anode terminal of the third diode D3 receives the low voltage of the first voltage terminal VSSA. Therefore, the third diode D3 is not conductive.

Figure 10:
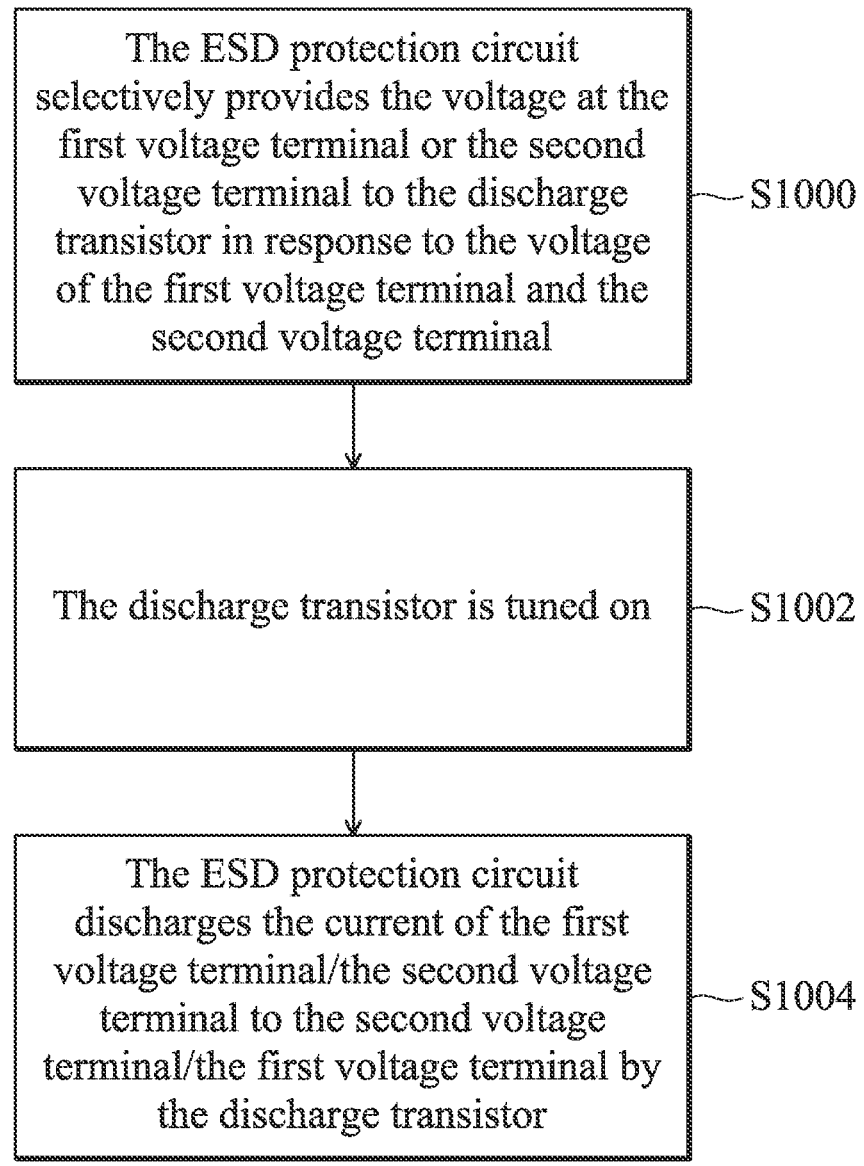
FIG. 10 is a flow chart illustrating an embodiment of an ESD protection method of the present invention.

FIG. 10 is a flow chart illustrating an embodiment of an ESD protection method of the present invention. The ESD protection method is applied to the ESD protection circuit 400 of FIG. 2. The process starts at step S1000.

In step S1000, the ESD protection circuit 400 selectively provides the voltage at the first voltage terminal VSSA or the second voltage terminal VSSD to the control terminal of the discharge transistor (MNpath or MPpath) in response to the voltage of the first voltage terminal VSSA and the second voltage terminal VSSD, and selectively provides the voltage of the first voltage terminal VSSA or the second voltage terminal VSSD to the substrate of the discharge transistor by the third switch or the fourth switch.

In the embodiment of FIG. 2, the discharge transistor MNpath is an N-type field effect transistor. When the voltage at the first voltage terminal VSSA is greater than the voltage at the second voltage terminal VSSD by the first predetermined value, the first switch 401A is conductive to provide the voltage at the first voltage terminal VSSA to the control terminal of the discharge transistor MNpath, and the fourth switch 404A is conductive to provide the voltage at the second voltage terminal VSSD to the substrate of the discharge transistor MNpath. Namely, the first switch 401A turns on to provide the high voltage of the first voltage terminal VSSA to the control terminal of the discharge transistor MNpath, and the fourth switch 404A turns on to provide the low voltage of the second voltage terminal VSSD to the substrate of the discharge transistor MNpath. When the second voltage terminal VSSD is greater than the voltage at the first voltage terminal VSSA by the second predetermined value, the second switch 402A is conductive to provide the voltage at the second voltage terminal VSSD to the control terminal of the discharge transistor MNpath, and the third switch 403A is conductive to provide the voltage at the first voltage terminal VSSA to the substrate of the discharge transistor MNpath. Namely, the second switch 402A turns on to provide the high voltage at the second voltage terminal VSSD to the control terminal of the discharge transistor MNpath, and the third switch 403A turns on to provide the voltage at the first voltage terminal VSSA to the substrate of the discharge transistor MNpath.

In the embodiment of FIG. 6, the discharge transistor MPpath is a P-type field effect transistor. When the voltage at the first voltage terminal VSSA is greater than the voltage at the second voltage terminal VSSD by the first predetermined value, the second switch 402B is conductive to provide the voltage at the second voltage terminal VSSD to the control terminal of the discharge transistor MPpath, and the third switch 403B is conductive to provide the voltage at the first voltage terminal VSSA to the substrate of the discharge transistor MPpath. Namely, the second switch 402B is turned on to provide the low voltage of the second voltage terminal VSSD to the control terminal of the discharge transistor MPpath, and the third switch 403B is turned on to provide the high voltage of the first voltage terminal VSSA to the substrate of the discharge transistor MPpath. When the second voltage terminal VSSD is greater than the voltage at the first voltage terminal VSSA by the second predetermined value, the first switch 401B is conductive to provide the voltage of the first voltage terminal VSSA to the control terminal of the discharge transistor MPpath, and the fourth switch 404B is conductive to provide the voltage of the second voltage terminal VSSD to the substrate of the discharge transistor MPpath. Namely, the first switch 401B is turned on to provide the low voltage of the first voltage terminal VSSA to the control terminal of the discharge transistor MPpath, and the fourth switch 404B is turned on to provide the high voltage of the second voltage terminal VSSD to the substrate of the discharge transistor MPpath.

Next, in step S1002, the discharge transistor is turned on. More specifically, in the embodiment of FIG. 3, the discharge transistor MNpath is an N-type field effect transistor. When a high voltage is applied to the control terminal of the discharge transistor MNpath and a low voltage is applied to the substrate of the discharge transistor MNpath, the discharge transistor MNpath is conductive. In the embodiment of FIG. 6, the discharge transistor MPpath is a P-type field effect transistor. When a high voltage is applied to the control terminal of the control terminal of the discharge transistor MPpath, and a high voltage is applied to the substrate of the discharge transistor MPpath, the discharge transistor MPpath is conductive.

Next, in step S1004, the ESD protection circuit 400 discharges the current of the first voltage terminal VSSA to the second voltage terminal VSSD by the discharge transistor, or discharges the current of the second voltage terminal VSSD to the first voltage terminal VSSA by the discharge transistor. More specifically, when the voltage at the first voltage terminal VSSA is greater than the voltage at the second voltage terminal VSSD by the first predetermined value, the discharge transistor is turned on for discharging the current of the first voltage terminal VSSA to the second voltage terminal VSSD. When the second voltage terminal VSSD is greater than the voltage at the first voltage terminal VSSA by the second predetermined value, the discharge transistor is turned on for discharging the current of the second voltage terminal VSSD to the first voltage terminal VSSA. The process ends at step S1004.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An ESD protection circuit, comprising:
    a first voltage terminal;
    a second voltage terminal;
    a discharge transistor, having a first terminal coupled to the first voltage terminal, a second terminal coupled to the second voltage terminal, a control terminal coupled to a first node, and a substrate coupled to a second node, wherein the discharge transistor forms a discharge path between the first voltage terminal and the second voltage terminal;
    a first switch, coupled between the first voltage terminal and the first node, arranged to selectively provide voltage at the first voltage terminal to the control terminal of the discharge transistor;
    a second switch, coupled between the first node and the second voltage terminal, arranged to selectively provide voltage at the second voltage terminal to the control terminal of the discharge transistor;
    a third switch, coupled between the first voltage terminal and the second node, arranged to selectively provide voltage at the first voltage terminal to the substrate of the discharge transistor; and
    a fourth switch, coupled between the second node and the second voltage terminal, arranged to selectively provide voltage at the second voltage terminal to the substrate of the discharge transistor.

2. The ESD protection circuit as claimed in claim 1, wherein the discharge transistor is conductive when voltage at the first voltage terminal is greater than voltage at the second voltage terminal by a first predetermined value for discharging current of the first voltage terminal to the second voltage terminal, and the discharge transistor is conductive when voltage at the second voltage terminal is greater than voltage at the first voltage terminal by a second predetermined value for discharging current of the second voltage terminal to the first voltage terminal.

3. The ESD protection circuit as claimed in claim 2, wherein the discharge transistor is an N-type field effect transistor, and when voltage at the first voltage terminal is greater than voltage at the second voltage terminal by the first predetermined value, the first switch is conductive for providing voltage at the first voltage terminal to the control terminal of the discharge transistor, and the fourth switch is conductive for providing voltage at the second voltage terminal to the substrate of the discharge transistor.

4. The ESD protection circuit as claimed in claim 3, wherein when voltage at the second voltage terminal is greater than voltage at the first voltage terminal by the second predetermined value, the second switch is conductive for providing voltage at the second voltage terminal to the control terminal of the discharge transistor, and the third switch is conductive for providing voltage at the first voltage terminal to the substrate of the discharge transistor.

5. The ESD protection circuit as claimed in claim 4, wherein the first switch is a first P-type field effect transistor having a first terminal coupled to the first voltage terminal, a second terminal coupled to the first node, a control terminal coupled to the second voltage terminal and a substrate coupled to the first voltage terminal.

6. The ESD protection circuit as claimed in claim 4, wherein the first switch is a first N-type field effect transistor having a first terminal coupled to the first voltage terminal, a second terminal coupled to the first node, a control terminal coupled to the first voltage terminal and a substrate coupled to the second voltage terminal.

7. The ESD protection circuit as claimed in claim 4, wherein the first switch is a first diode having an anode terminal coupled to the first voltage terminal and a cathode terminal coupled to the first node.

8. The ESD protection circuit as claimed in claim 4, wherein the second switch is a second P-type field effect transistor having a first terminal coupled to the second voltage terminal, a second terminal coupled to the first node, a control terminal coupled to the first voltage terminal and a substrate coupled to the second voltage terminal.

9. The ESD protection circuit as claimed in claim 4, wherein the second switch is a second N-type field effect transistor having a first terminal coupled to the second voltage terminal, a second terminal coupled to the first node, a control terminal coupled to the second voltage terminal and a substrate coupled to the first voltage terminal.

10. The ESD protection circuit as claimed in claim 4, wherein the second switch is a second diode having an anode terminal coupled to the second voltage terminal and a cathode terminal coupled to the first node.

11. The ESD protection circuit as claimed in claim 4, wherein the third switch is a third N-type field effect transistor having a first terminal coupled to the first voltage terminal, a second terminal coupled to the second node, a control terminal coupled to the second voltage terminal and a substrate coupled to the first voltage terminal.

12. The ESD protection circuit as claimed in claim 4, wherein the fourth switch is a fourth N-type field effect transistor having a first terminal coupled to the second voltage terminal, a second terminal coupled to the second node, a control terminal coupled to the first voltage terminal and a substrate coupled to the second voltage terminal.

13. The ESD protection circuit as claimed in claim 2, wherein the discharge transistor is P-type field effect transistor, and when voltage at the first voltage terminal is greater than voltage at the second voltage terminal by the first predetermined value, the second switch is conductive for providing voltage at the second voltage terminal to the control terminal of the discharge transistor, and the third switch is conductive for providing voltage at the first voltage terminal to the substrate of the discharge transistor.

14. The ESD protection circuit as claimed in claim 13, wherein when voltage at the second voltage terminal is greater than voltage at the first voltage terminal by the second predetermined value, the first switch is conductive for providing voltage at the first voltage terminal to the control terminal of the discharge transistor, and the fourth switch is conductive for providing voltage at the second voltage terminal to the substrate of the discharge transistor.

15. The ESD protection circuit as claimed in claim 13, wherein the first switch is a first N-type field effect transistor having a first terminal coupled to the first voltage terminal, a second terminal coupled to the first node, a control terminal coupled to the second voltage terminal and a substrate coupled to the first voltage terminal.

16. The ESD protection circuit as claimed in claim 13, wherein the second switch is a second N-type field effect transistor having a first terminal coupled to the second voltage terminal, a second terminal coupled to the first node, a control terminal coupled to the first voltage terminal and a substrate coupled to the second voltage terminal.

17. The ESD protection circuit as claimed in claim 13, wherein the third switch is a third P-type field effect transistor having a first terminal coupled to the first voltage terminal, a second terminal coupled to the second node, a control terminal coupled to the second voltage terminal and a substrate coupled to the first voltage terminal.

18. The ESD protection circuit as claimed in claim 13, wherein the third switch is a third N-type field effect transistor having a first terminal coupled to the first voltage terminal, a second terminal coupled to the second node, a control terminal coupled to the first voltage terminal and a substrate coupled to the second voltage terminal.

19. The ESD protection circuit as claimed in claim 13, wherein the third switch is a third diode having an anode terminal coupled to the first voltage terminal, and a cathode terminal coupled to the second node.

20. The ESD protection circuit as claimed in claim 13, wherein the fourth switch is a fourth P-type field effect transistor having a first terminal coupled to the second voltage terminal, a second terminal coupled to the second node, a control terminal coupled to the first voltage terminal and a substrate coupled to the second voltage terminal.

21. The ESD protection circuit as claimed in claim 13, wherein the fourth switch is a fourth N-type field effect transistor having a first terminal coupled to the second voltage terminal, a second terminal coupled to the second node, a control terminal coupled to the second voltage terminal and a substrate coupled to the first voltage terminal.

22. The ESD protection circuit as claimed in claim 13, wherein the fourth switch is a fourth diode having an anode terminal coupled to the second voltage terminal, and a cathode terminal coupled to the second node.

23. An ESD protection method, applied to an ESD protection circuit, wherein the ESD protection circuit comprises a discharge transistor, a first switch, a second switch, a third switch and a fourth switch, the ESD protection method comprising:
   selectively providing voltage at a first voltage terminal or a second voltage terminal to a control terminal of the discharge transistor by the first switch or the second switch according to the voltage at the first voltage terminal and the second voltage terminal to turn on the discharge transistor;
   selectively providing the voltage at the first voltage terminal or the second voltage terminal to a substrate of the discharge transistor by the third switch or the fourth switch according to the voltage of the first voltage terminal or the second voltage terminal to turn on the discharge transistor; and
   discharging current of the first voltage terminal to the second voltage terminal by the discharge transistor, or discharging current of the second voltage terminal to the first voltage terminal by the discharge transistor.

24. The ESD protection method as claimed in claim 23, wherein step of discharging the current of the first voltage terminal to the second voltage terminal or discharging the current of the second voltage terminal to the first voltage terminal by the discharge transistor further comprises:
   enabling the voltage at the first voltage terminal to be greater than the voltage at the second voltage terminal by a first predetermined value to turn on the discharge transistor to discharge the current of the first voltage terminal to the second voltage terminal; and
   enabling the voltage of the second voltage terminal to be greater than the voltage of the first voltage terminal by a second predetermined value to turn on the discharge transistor for discharging the current of the second voltage terminal to the first voltage terminal.

25. The ESD protection method as claimed in claim 24, wherein the discharge transistor is an N-type field effect transistor, and the step of selectively providing the voltage at the first voltage terminal and the second voltage terminal by the first switch, the second switch, the third switch and/or the fourth switch further comprises:

when the voltage at the first voltage terminal is greater than the voltage at the second voltage terminal by the first predetermined value, turning on the first switch for providing the voltage at the first voltage terminal to the control terminal of the discharge transistor, and turning on the fourth switch for providing the voltage at the second voltage terminal to the substrate of the discharge transistor; and when the voltage at the second voltage terminal is greater than the voltage at the first voltage terminal by the second predetermined value, turning on the second switch for providing the voltage at the second voltage terminal to the control terminal of the discharge transistor, and turning on the third switch for the voltage of the first voltage terminal to the substrate of the discharge transistor.

26. The ESD protection method as claimed in claim 24, wherein the discharge transistor is a P-type field effect transistor, and the step of selectively providing the voltage at the first voltage terminal and the second voltage terminal by the first switch, the second switch, the third switch and/or the fourth switch further comprises:

when the voltage at the first voltage terminal is greater than the voltage at the second voltage terminal by the first predetermined value, turning on the second switch for providing the voltage at the second voltage terminal to the control terminal of the discharge transistor, and turning on the third switch for providing the voltage at the first voltage terminal to the substrate of the discharge transistor; and when the voltage at the second voltage terminal is greater than the voltage at the first voltage terminal by the second predetermined value, turning on the first switch for providing the voltage at the first voltage terminal to the control terminal of the discharge transistor, and turning on the fourth switch for providing the voltage at the second voltage terminal to the substrate of the discharge transistor.

* * * * *